United States Patent
Chiu

(10) Patent No.: US 7,389,931 B2
(45) Date of Patent: Jun. 24, 2008

(54) BEAM-FORMING APERTURE FOR BARCODE APPLICATIONS

(75) Inventor: Lihu M. Chiu, Arcadia, CA (US)

(73) Assignee: Printronix, Inc., Irvine, CA (US)

( * ) Notice: Subject to any disclaimer, the term of this patent is extended or adjusted under 35 U.S.C. 154(b) by 64 days.

(21) Appl. No.: 11/436,848

(22) Filed: May 17, 2006

(65) Prior Publication Data

US 2007/0267499 A1    Nov. 22, 2007

(51) Int. Cl.
    *G06K 9/24* (2006.01)
(52) U.S. Cl. .............................. 235/462.32; 235/462.35
(58) Field of Classification Search ............ 235/462.32, 235/462.33, 462.35, 462.42; 359/710, 718, 359/719, 443, 461, 206, 662, 641; 403/103; 382/112
    See application file for complete search history.

(56) References Cited

U.S. PATENT DOCUMENTS 5,200,597 A * 4/1993 Eastman et al. ............. 235/455
5,742,038 A * 4/1998 Dvorkis et al. .......... 235/462.38
5,886,332 A * 3/1999 Plesko .................... 235/472.01
6,535,299 B1 * 3/2003 Scherz ....................... 358/1.18

* cited by examiner

*Primary Examiner*—Daniel St. Cyr
(74) *Attorney, Agent, or Firm*—Jonathan W. Hallman; MacPherson Kwok Chen & Heid LLP

(57) ABSTRACT

In one embodiment, a system is provided that includes: a laser source is provided that producing a laser beam that diverges in a first direction and in a second direction orthogonal to the first direction; a lens positioned to receive the laser beam from the laser source and provide a magnified laser beam; and an opaque screen having an elongated aperture having a longitudinal axis aligned substantially parallel to the first direction, the aperture being positioned to intercept the magnified laser beam such that a projected laser beam from the aperture is focused into an elongated illumination spot, the elongated illumination spot having a longitudinal axis aligned substantially parallel to the second direction.

19 Claims, 5 Drawing Sheets

US 7,389,931 B2

BEAM-FORMING APERTURE FOR BARCODE APPLICATIONS

TECHNICAL FIELD

This invention relates to laser optics. More particularly, the present invention relates to an optical system for barcode verification.

BACKGROUND

Barcodes are essential to modern commerce. Virtually any commercially available item receives a barcode identification. Consumers, manufacturers, and retailers all benefit from their use because it is the least expensive yet most reliable way of providing machine-readable information. Given how pervasive barcoding has become for modern commerce, various "barcode verification" schemes have been developed to characterize the quality of a given barcode label. For example, with regard to one-dimensional barcodes, the Uniform Code Council (UCC) has promulgated nine separate categories of barcode quality. To ascertain the quality in these categories, a barcode verifier scans a laser beam across a barcode.

In a conventional barcode verifier, the laser beam is focused into a generally circular illumination spot on the barcode. This illumination spot scans across a "slice" of the barcode during the verification in a direction generally normal to the longitudinal axis of the bars in the barcode. As the illumination spot is scanned, it will cross the unprinted media between the bars. This is problematic because the coherent nature of the laser beam makes it susceptible to specular reflections from the unprinted media. In other words, a given slice of unprinted media between barcode bars may have a spot that strongly reflects the laser light as compared to other unprinted slices of the media. In turn, this specular reflection makes the measurement of contrast between the unprinted media and the bars noisy and unreliable because the increased reflectance diminishes the contrast for the barcode bars on either side of the shiny unprinted media slice. These barcode bars may be printed with acceptable quality yet be deemed unacceptable due to the specular return from the unprinted media.

Accordingly, there is a need in the art for improved barcode verifiers that are less susceptible to specular reflection noise but also retain a small effective aperture size.

SUMMARY

In accordance with an aspect of the invention, a system is provided that includes: a laser source producing a laser beam that diverges in a first direction and in a second direction orthogonal to the first direction; a lens positioned to receive the laser beam from the laser source and provide a magnified laser beam; and an opaque screen having an elongated aperture having a longitudinal axis aligned substantially parallel to the first direction, the aperture being positioned to intercept the magnified laser beam such that a projected laser beam from the aperture is focused into an elongated illumination spot, the elongated illumination spot having a longitudinal axis aligned substantially parallel to the second direction.

In accordance with another aspect of the invention, a method is provided that includes the acts of: providing a laser beam diverging in both a first direction and in a second orthogonal direction; focusing the laser beam through a lens to produce a focused laser beam in which both divergences are negative; and projecting the focused laser beam through an a slit-shaped aperture having a longitudinal axis substantially aligned in the first direction such that a projected laser beam from the slit-shaped aperture focuses into a slit-shaped illumination spot having a longitudinal axis substantially aligned in the second direction.

In accordance with another aspect of the invention, a system is provided that includes: a bar code printer; and a bar code verification system integrated with the bar code printer that includes: a laser source producing a laser beam that diverges in a first direction and in a second direction orthogonal to the first direction; a lens positioned to receive the laser beam from the laser source and provide a magnified laser beam; an opaque screen having an elongated aperture having a longitudinal axis aligned substantially parallel to the first direction, the aperture being positioned to intercept the magnified laser beam such that a projected laser beam from the aperture is focused into an elongated illumination spot, the elongated illumination spot having a longitudinal axis aligned substantially parallel to the second direction.

DETAILED DESCRIPTION

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention.

Figure 1:
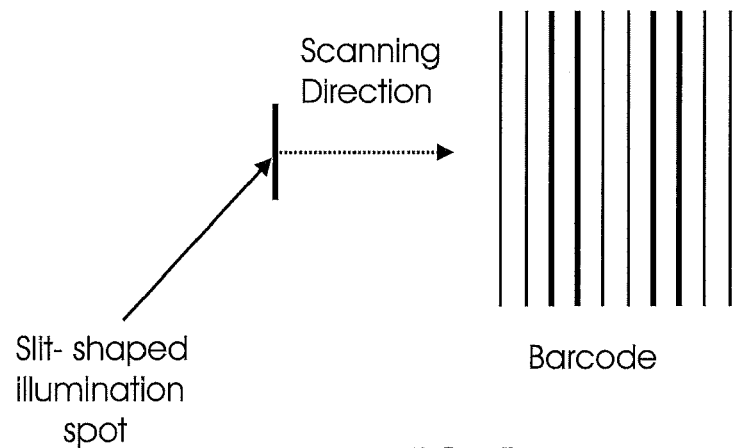
FIG. 1 illustrates a slit-shaped illumination spot scanning across a barcode in accordance with an embodiment of the invention.
Figure 2:
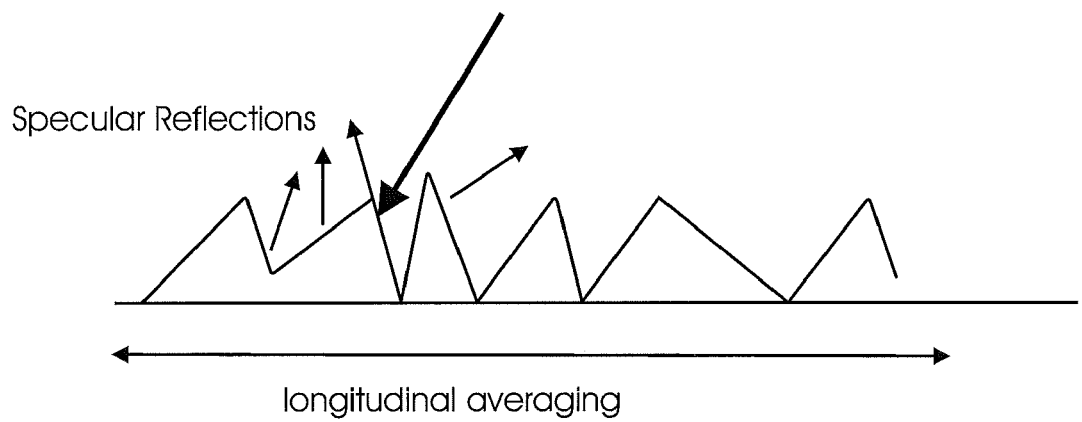
FIG. 2 is a cross-sectional view of an uneven media surface producing specular returns that may be minimized if the response is averaged across the longitudinal direction in accordance with an embodiment of the invention.

To address the need in the barcode verifier art for improved resistance to specular reflections from unprinted media, a barcode verifier is provided that produces a slit-shaped illumination spot as illustrated in FIG. 1. This illumination spot has a longitudinal axis parallel to the longitudinal axis of the barcode bars. As this spot crosses the unprinted media between bars in a lateral direction, it will tend to average out any specular responses. To properly average the media response in the longitudinal direction, the lateral extent of the slit-shaped illumination spot should be largely contained within the minimum separation between barcode bars. Thus, as the illumination spot moves between two adjacent bar code bars, the spot will be primarily illuminating only the stripe of unprinted media between the adjacent bar code bars. The longitudinal extent of the illumination spot will thus tend to average out specular returns produced, for example, by an uneven media surface. An exemplary averaging is illustrated in FIG. 2. As indicated by the incident arrow, a conventional circular-shaped illumination spot will experience specular returns from the uneven media surface. However, a slit-shaped spot extended across (in a longitudinal fashion) across the uneven media surface will have some specular returns and also some non-specular returns. This averaging of a variety of specular and non-specular returns will tend to be the same for all the stripes of unprinted media within the barcode. Thus, the media noise resulting from specular returns is minimized. At the same time, the slit-shaped illumination spot retains sensitivity to thermal defects in the longitudinal direction of the bars. Moreover, it maintains a small defects reading in the lateral direction.

The production of the slit-shaped illumination spot takes advantage of a common property for conventional laser sources such as, for example, index-guided laser diodes and vertical cavity surface emitting lasers (VCSELs). These devices are constructed such that the emitted laser beam has a greater divergence in a first normal axis to the beam direction than in a second normal axis. The divergence in the first axis may be denoted as $\Theta$ perpendicular whereas the divergence in the second axis may be denoted as $\Theta$ parallel. In general, $\Theta$ perpendicular is approximately 4 times greater than $\Theta$ parallel. The divergences are defined with respect to the laser beam waist, which is a rather remarkable property of coherent laser beams having a Gaussian electric field distribution in a plane perpendicular (such as $\Theta$ perpendicular or $\Theta$ parallel) to the beam travel. As suggested by the term "waist," a laser beam (which generally has a Gaussian power distribution) will have a beam radius that reaches a minimum at some point usually reasonably close to the laser source. For example, for a Quantum Semiconductor QAL laser diode, the waist occurs approximately 8 mm from the laser diode (which also includes a 1:1 lens). The $\Theta$ perpendicular and $\Theta$ parallel divergences are defined from a propagation point at the waist. The longitudinal axis for the $\Theta$ parallel divergence may be denoted as the parallel axis whereas the longitudinal axis for the $\Theta$ perpendicular divergence may be denoted as the perpendicular axis.

Figure 3:
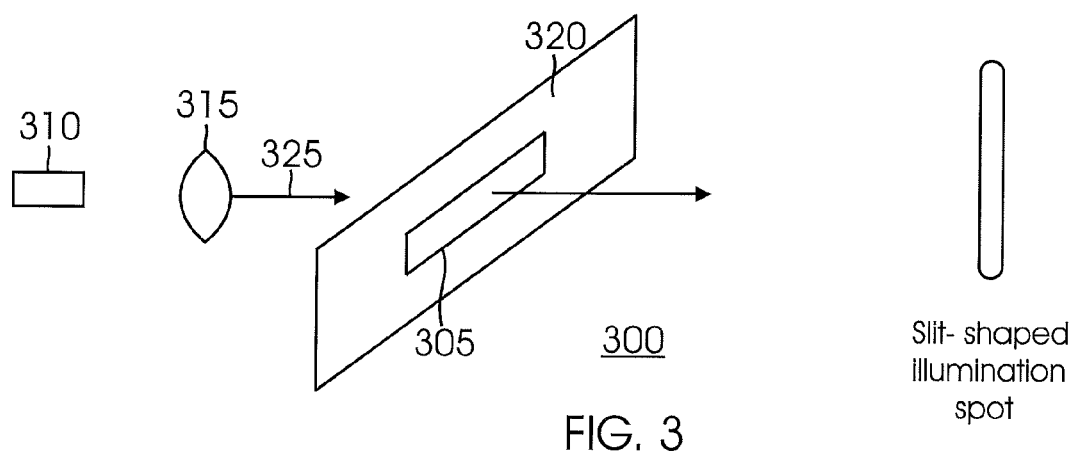
FIG. 3 is an illustration of a laser beam projection system that provides a slit-shaped illumination spot in accordance with an embodiment of the invention.

Turning now to FIG. 3, a system 300 is illustrated that includes a slit-shaped aperture 305. A laser source such as a laser diode 310 produces a laser beam that is focused through an objective lens 315. A laser beam 325 passes through the objective lens to an opaque screen 320 that includes the slit-shaped aperture. The longitudinal axis of the aperture is parallel to the parallel axis of the laser beam. The longitudinal axis of the aperture is thus orthogonal to the perpendicular axis of the laser beam.

The magnification of the objective lens depends upon the desired length between the resulting slit-shaped illumination spot and the objective lens. For example, if a desired length L between the spot and the lens is nine inches, it can be shown that a magnification M for the objective lens is given by $$M+(1-(L-0.3)/f)*D_0/L$$

where $D_0$ is the waist length (which may be determined experimentally using a beam analyzer), and f is the focal length. For a focal length of 0.315" and a $D_0$ of 0.229", the magnification becomes approximately −0.677, which indicates that the beam is converging (negative divergence) from the waist. To maximize transmitted laser power, the aperture is preferably located in the vicinity of the waist.

It can be shown that the beam divergence coming from the objective lens is $M^2*4*\lambda/\pi*D_0$ times the beam divergence for the unmagnified (1:1 lens) laser source. A conventional red wavelength laser diode source may have a $\Theta$ parallel divergence of approximately 8 degrees. For the magnification of −0.677, it may thus be shown that the $\Theta$ parallel divergence from the objective lens for such a diode is approximately −0.133*8, which equals −1.064 degrees. Because the $\Theta$ perpendicular divergence will be about four times greater, the $\Theta$ perpendicular divergence from the objective lens will be approximately 4 degrees.

Because the longitudinal axis of the slit-shaped aperture is aligned with the parallel axis, the beam is allowed to diverge (actually converge since the divergence is negative) in a substantially normal fashion in this axis. However, because the slit is relatively narrow in the perpendicular axis direction, the $\Theta$ perpendicular divergence is greatly constrained. Thus, the slit-shaped illumination spot at the desired distance (such as the nine inches discussed earlier) will have converged much more in the parallel axis direction than in the perpendicular axis direction. It will thus be orthogonal to the aperture, i.e, the longitudinal axis of the slit-shaped illumination spot will be aligned in the perpendicular axis direction whereas the longitudinal axis of the slit-shaped aperture is aligned in the parallel axis direction. However, because the $\Theta$ perpendicular divergence is substantially greater than the $\Theta$ parallel divergence, the slit-shaped illumination spot has an acceptable power level. If the $\Theta$ perpendicular divergence was comparable to the $\Theta$ parallel divergence, a more powerful laser beam source would be required. It will be appreciated, however, that a slit-shaped illumination spot may be produced from a laser diode source having an arbitrary relationship between its $\Theta$ perpendicular and parallel divergences. However, the relationship discussed above provides an advantageous power gain.

Figure 4:
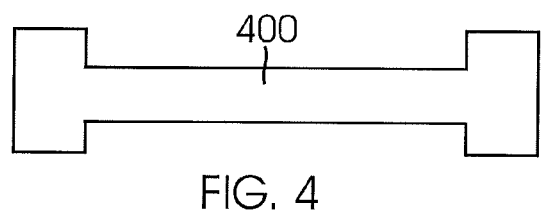
FIG. 4 is an illustration of a slit-shaped aperture having a non-uniform width adapted to produce a more uniform power distribution across the slit-shaped illumination spot in accordance with an embodiment of the invention.

The power distribution across the illumination spot may be Gaussian or substantially Gaussian. Thus, the majority of the laser energy will be present at the center of the illumination spot, which may lead to media noise from specular returns at this center. To provide a more uniform power profile across the longitudinal axis of the illumination spot, a "bone-shaped" aperture may be used in which the width of the aperture is increased at either end of the longitudinal ends such as seen in FIG. 4 for an aperture 400. The increased power that is thus transmitted either end of aperture 400 diminishes the tendency for the illumination spot to have a Gaussian distribution. Instead, a more uniform power distribution is produced across the longitudinal axis of the illumination spot, thereby reducing media noise from specular reflections.

Figure 5A:
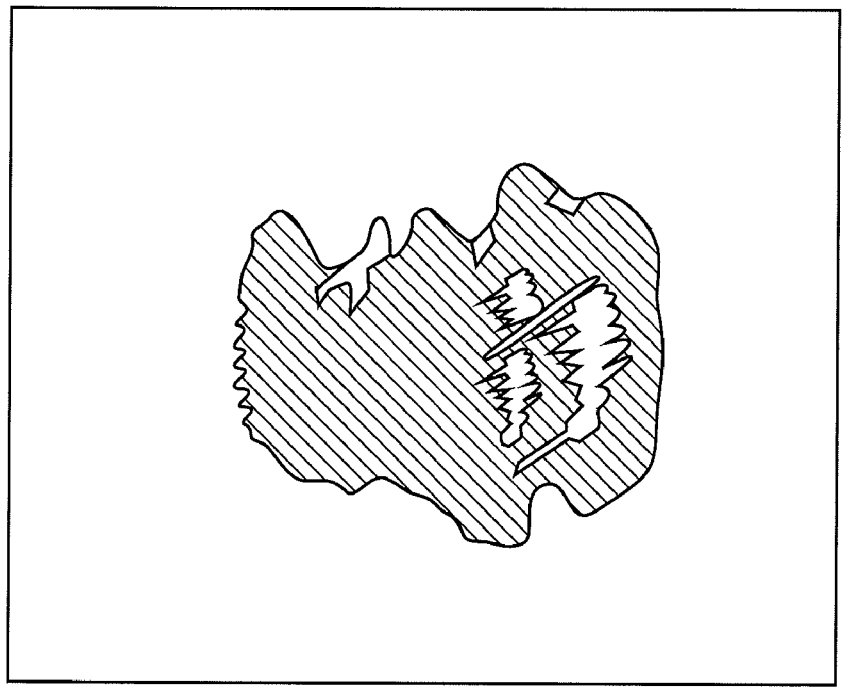
FIG. 5a illustrates a laser beam power profile taken at a pre-focus distance for the system of FIG. 3.
Figure 5B:
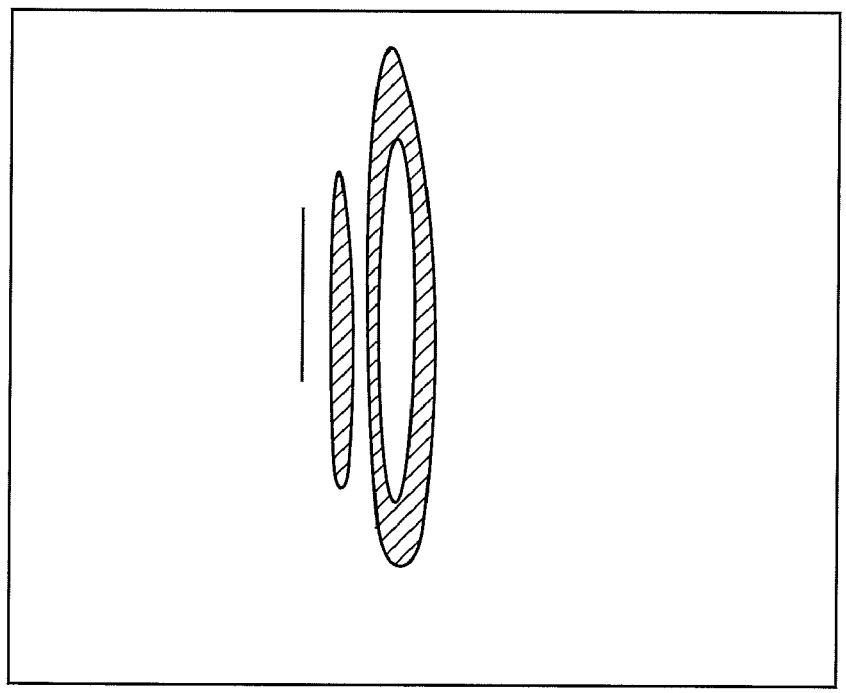
FIG. 5b illustrates a laser beam power profile taken at the focus distance for the system of FIG. 3.
Figure 5C:
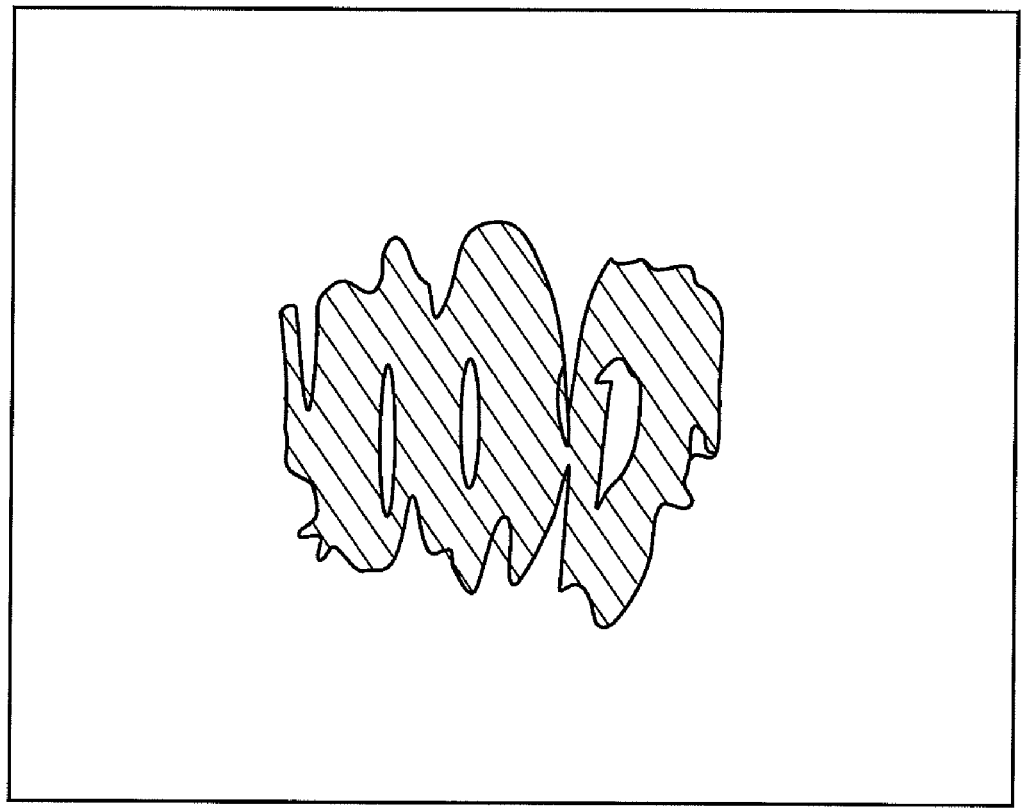
FIG. 5c illustrates a laser beam power profile taken at a post-focus distance for the system of FIG. 3.

As would be expected given the parallel-axis alignment of the aperture, the laser power intensity before and after the desired focal distance is substantially distributed across the parallel axis. For example, FIG. 5a illustrates an exemplary power distribution at a distance prior to the desired focal distance whereas FIG. 5c illustrates a power distribution at a distance past the desired focal distance. In contrast, the power distribution at the focal distance in FIG. 5b is aligned across the perpendicular axis.

Depending upon the magnification and aperture dimensions, a slit-shaped illumination spot may be achieved for any desired application. For example, a 3 dB power distribution width that fits within the separation between bar code bars may be achieved, such as a width of 1.25 mils. Making the aperture smaller reduces the transmitted power and thus may require a more powerful laser source. The slit-shaped illumination spot is ideal for verification of bar codes. The slit-shaped illumination spot is also ideal for bar code reading applications in which the focal length between the bar code and the bar code reader is maintained at a constant distance.

Figure 6:
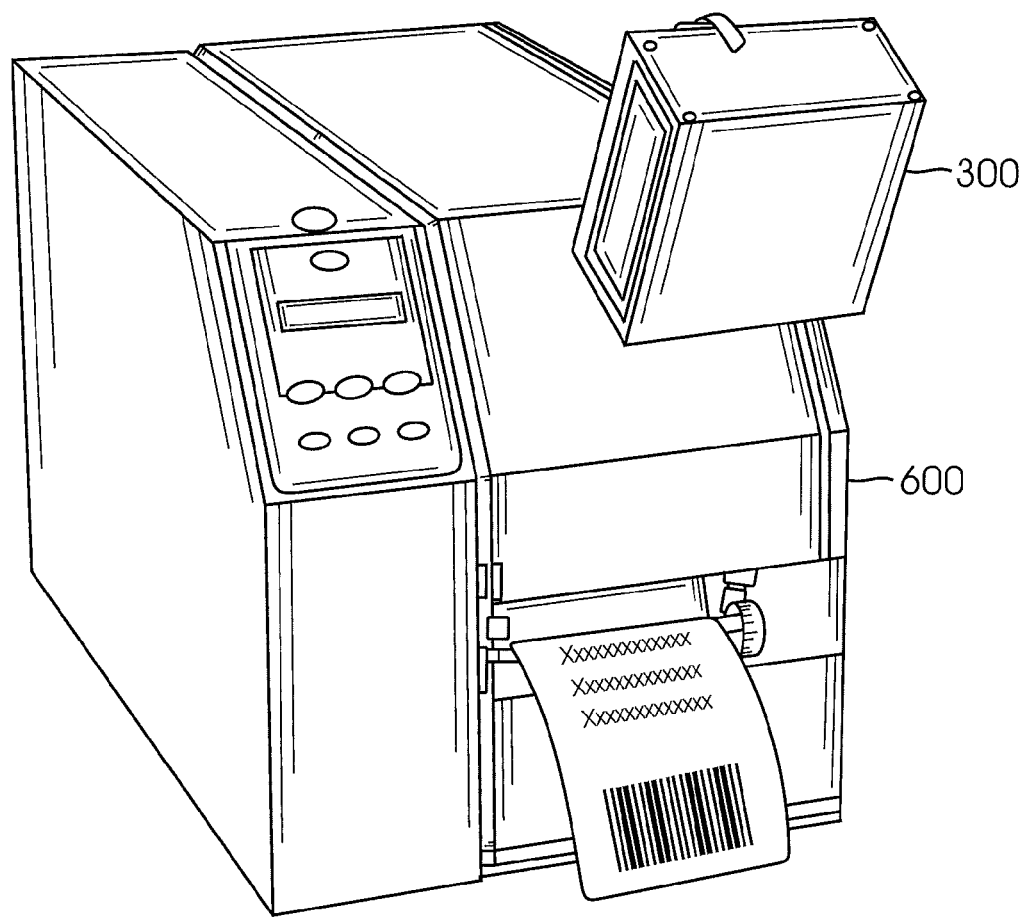
FIG. 6 illustrates a bar code printer that includes a laser beam projection system that provides a slit-shaped illumination spot in accordance with an embodiment of the invention.

Turning now to FIG. 6, a barcode printer 600 is illustrated that includes a laser diode source and aperture combination such as system 300 discussed with regard to FIG. 3. In this fashion, printer 600 may print a bar code and immediately verify the quality of the printed bar code. As a result, a user of printer 600 can be assured that the printed barcodes will always satisfy a desired quality level. Printer 600 includes a controller such as a microprocessor (not illustrated) that controls the verification of a bar code using the laser diode source and aperture combination.

The above-described embodiments of the present invention are merely meant to be illustrative and not limiting. It will thus be obvious to those skilled in the art that various changes and modifications may be made without departing from this invention in its broader aspects. Therefore, the appended claims encompass all such changes and modifications as fall within the true spirit and scope of this invention.

What is claimed is:

1. A system for scanning a bar code, the bar code having bars with longitudinal axes aligned with a first direction, comprising;
   a laser source producing a laser beam that diverges in the first direction and in a second direction orthogonal to the first direction and the longitudinal axes of the bars;
   a lens positioned to receive the laser beam from the laser source and provide a magnified laser beam; and
   an opaque screen having an elongated aperture having a longitudinal axis aligned substantially parallel to the second direction, the aperture being positioned to intercept the magnified laser beam such that a projected laser beam from the aperture is focused into an elongated illumination spot, the elongated illumination spot having a longitudinal axis aligned substantially parallel to the first direction and the longitudinal axes of the bars.

2. The system of claim 1, wherein the divergence in the second direction is a $\Theta$ parallel divergence, and wherein the divergence in the first direction is a $\Theta$ perpendicular divergence.

3. The system of claim 2, wherein the lens is configured such that the $\Theta$ parallel divergence and the $\Theta$ perpendicular divergence are both negative.

4. The system of claim 3, wherein the laser source is adapted such that the $\Theta$ perpendicular divergence is greater than the $\Theta$ parallel divergence.

5. The system of claim 4, wherein the $\Theta$ perpendicular divergence is at least four times greater than the $\Theta$ parallel divergence.

6. The system of claim 1, wherein the laser source is adapted such that its laser beam is red.

7. The system of claim 1, wherein the elongated aperture has a substantially uniform width.

8. The system of claim 1, wherein the elongated aperture has a non-uniform width such that it is wider at opposing ends of the elongated aperture than it is at a middle of the elongated aperture.

9. The system of claim 1, wherein the elongated aperture is located at a waist for the magnified laser beam.

10. The system of claim 1, wherein the laser source is a laser diode.

11. A method for scanning a bar code label, the bar code label having bars with longitudinal axes aligned with a first direction, comprising:
   providing a laser beam diverging in both the first direction and in a second direction that is orthogonal to the first direction and the longitudinal axes of the bars;
   focusing the laser beam through a lens to produce a focused laser beam in which both divergences are negative; and
   projecting the focused laser beam through a slit-shaped aperture having a longitudinal axis substantially aligned in the second direction such that a projected laser beam from the slit-shaped aperture focuses into a slit-shaped illumination spot having a longitudinal axis substantially aligned in the first direction and parallel to the longitudinal axes of the bars.

12. The method of claim 11, wherein the divergence in the second direction is a $\Theta$ parallel divergence and wherein the divergence in the second direction is a $\Theta$ perpendicular divergence.

13. The method of claim 11, further comprising: verifying a quality of the barcode label by scanning the slit-shaped illumination spot across the barcode label.

14. The method of claim 11, further comprising: reading a content of the barcode label by scanning the slit-shaped illumination spot across the barcode label.

15. The method of claim 11, wherein a width of the illumination spot is less than a separation between the bars in the barcode label.

16. The method of claim 11, wherein the aperture is located at a waist of the magnified beam.

17. A system, comprising:
   a bar code printer; and
   a bar code verification system integrated with the bar code printer for verifying bar code labels printed by the bar code printer, each bar code label having bars with longitudinal axes aligned with a first direction, the bar code verification system including:
      a laser source producing a laser beam that diverges in the first direction and in a second direction orthogonal to the first direction and to the longitudinal axes of the bars;
      a lens positioned to receive the laser beam from the laser source and provide a magnified laser beam;
      an opaque screen having an elongated aperture having a longitudinal axis aligned substantially parallel to the second direction, the aperture being positioned to intercept the magnified laser beam such that a projected laser beam from the aperture is focused into an elongated illumination spot, the elongated illumination spot having a longitudinal axis aligned substantially parallel to the first direction and the longitudinal axes of the bars.

18. The system of claim 17, wherein the divergence in the second direction is a $\Theta$ parallel divergence, and wherein the divergence in the first direction is a $\Theta$ perpendicular divergence.

19. The system of claim 18, wherein the lens is configured such that the $\Theta$ parallel divergence and the $\Theta$ perpendicular divergence are both negative.

* * * * *